(12) United States Patent
Tan et al.

(10) Patent No.: US 12,346,724 B2
(45) Date of Patent: *Jul. 1, 2025

(54) SYSTEMS AND METHODS FOR CUSTOMIZATION OF WORKFLOW DESIGN

(71) Applicant: Nintex USA, Inc., Bellevue, WA (US)

(72) Inventors: Joshua Joo Hou Tan, Newport (AU); Alain Marie Patrice Gentilhomme, Sammamish, WA (US)

(73) Assignee: Nintex USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,018

(22) Filed: Feb. 22, 2024

(65) Prior Publication Data

US 2024/0192985 A1 Jun. 13, 2024

Related U.S. Application Data

(63) Continuation of application No. 17/983,234, filed on Nov. 8, 2022, now Pat. No. 11,947,997, which is a continuation of application No. 16/831,474, filed on Mar. 26, 2020, now Pat. No. 11,520,619.

(60) Provisional application No. 62/824,191, filed on Mar. 26, 2019.

(51) Int. Cl.
*G06F 9/48* (2006.01)
*G06F 9/38* (2018.01)
*G06F 9/50* (2006.01)
*G06F 9/54* (2006.01)
*G06Q 10/0631* (2023.01)

(52) U.S. Cl.
CPC ............ *G06F 9/485* (2013.01); *G06F 9/3836* (2013.01); *G06F 9/5044* (2013.01); *G06F 9/505* (2013.01); *G06F 9/546* (2013.01); *G06Q 10/06316* (2013.01)

(58) Field of Classification Search
CPC ...... G06F 9/485; G06F 9/3836; G06F 9/5044; G06F 9/505; G06F 9/546; G06Q 10/06316

See application file for complete search history.

(56) References Cited

U.S. PATENT DOCUMENTS

| 7,343,406 | B1 * | 3/2008 | Buonanno | G06Q 10/06 714/48 |
| 8,527,327 | B1 * | 9/2013 | Lawrence | G06Q 10/103 705/7.41 |
| 10,509,696 | B1 * | 12/2019 | Gilderman | G06F 11/0727 |
| 2004/0056878 | A1 * | 3/2004 | Lau | G06F 3/0481 715/706 |

(Continued)

*Primary Examiner* — April Y Blair
*Assistant Examiner* — Jonathan R Labud
(74) *Attorney, Agent, or Firm* — Perkins Coie LLP

(57) ABSTRACT

Disclosed here are systems and methods that allow users, upon detecting errors within a running workflow, to either 1) pause the workflow and directly correct its design before resuming the workflow, or 2) pause the workflow, correct the erred action within the workflow, resume running the workflow, and afterwards apply the corrections to the design of the workflow. The disclosure comprises functionality that pauses a single workflow and other relevant workflows as soon as the error is detected and while it is corrected. The disclosed systems and methods improve communication technology between the networks and servers of separate parties relevant and/or dependent on successful execution of other workflows.

20 Claims, 7 Drawing Sheets

(56) References Cited

U.S. PATENT DOCUMENTS

| | | | |
|---|---|---|---|
| 2008/0244565 A1* | 10/2008 | Levidow | G06F 9/5038 |
| | | | 717/176 |
| 2014/0074700 A1* | 3/2014 | Smith | G06Q 20/023 |
| | | | 705/39 |
| 2018/0143854 A1* | 5/2018 | Kumar | G06F 9/4881 |

* cited by examiner

SYSTEMS AND METHODS FOR CUSTOMIZATION OF WORKFLOW DESIGN

CROSS-REFERENCE TO RELATED APPLICATION(S)

This application is a continuation of U.S. application Ser. No. 17/983,234, filed Nov. 8, 2022 (U.S. Pat. No 11,947, 997), which is a continuation of U.S. application Ser. No. 16/831,474, filed on Mar. 26, 2020 (U.S. Pat. No. 11,520, 619), which claims priority to U.S. Provisional Application No. 62/824,191, filed on Mar. 26, 2019, the contents of which are incorporated by reference herein in their entireties.

FIELD OF USE

The present disclosure relates generally to the field of customized workflow process technology. More specifically, the present disclosure relates to enhanced systems and methods for workflow technology that provides options for correcting workflow designs by detecting and pinpointing errors in workflows, pausing workflows, providing efficient corrective recourses for revising the underlying design of the workflows, and replaying the revised workflows.

BACKGROUND

Programmatic workflows are applications and systems that streamline and automate a wide variety of business processes. Workflow technology is enabling individuals and organizations across various industries to automate processes in a way that dramatically enhances productivity and efficiency. As a result, workflow technology is becoming more complex and is being integrated with other types of technology. A workflow process may, at a single point in time, be integrated to interact with various other workflows, receive input from multiple users, and depend on the occurrence of pre-determined events. A single workflow process may only be a small cog in a wheel within a large, complex system of moving parts for carrying out a business process, yet still play a vital role in the successful completion of the overall business process. Consequently, any errors within or disruptions to a single workflow may have a significant, negative impact on the overall process and/or its individual components.

Currently, users of existing programmatic workflow technology are limited in their ability to correct the underlying design of a workflow upon an error occurring within the workflow. And when an error is detected and corrected, the workflow may still have to run its course before a user is able to make changes to its design, if such changes are even possible. Additionally, due to relationships with other processes and technology, errors in the design of a single workflow can also impede and prevent other processes from being carried out on time or completely at all. And while an error may inhibit some workflows from being carried out, others may continue unimpeded, relying on incomplete or incorrect data. This results in the potential for further errors within other workflows and additional costs, delays, and user frustration.

Thus, what is needed are systems and methods that allow users, upon detecting errors, to either 1) pause the workflow and directly correct its design before resuming the workflow, or 2) pause the workflow, correct the erred action within the workflow, resume running the workflow, and afterwards apply the corrections to the design of the workflow. This improved communication technology should also comprise functionality that pauses a single workflow and other relevant workflows as soon as the error is detected and while it is corrected. Such systems and methods should also improve communication technology between the networks and servers of separate parties relevant and/or dependent on successful execution of other workflows; allowing for effective understanding, implementation, and engagement of business processes across organizational boundaries.

SUMMARY

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems and methods for workflow design customization that, in addition to pausing, correcting, and replaying single workflow instances, corrects the underlying design of erred workflows. The design customization may carry this out by: detecting an erred action in a workflow; pausing the erred workflow upon detection of the erred action; pausing other related or corresponding workflows, processes, and instruments related to the execution of the erred workflow; generating and displaying a notification of the workflow with the erred action; and generating corrective options for correcting the design of the workflow with the erred action, wherein the corrective options comprise one or both of the following options: the option to directly correct the design of the workflow and the option to correct the design of the workflow from a single workflow instance. The option to directly correct the design of the workflow allows a user to go directly to the design of the workflow, make corrections to the design, and then republish the workflow. The option to correct the workflow design from a single instance allows a user to correct the erred workflow instance from the point of either the erred action or a point prior to the point of the erred action, and then apply the corrections/update to the design of the workflow. The design customization also provides options to pause relevant existing workflow executions and queue new workflow executions while the workflow design is corrected, either directly or through the single instance option. The paused executions can then be resumed either automatically or manually by a user. Such systems and methods may comprise communication technology between the networks and servers of separate parties relevant and/or dependent on successful execution of other processes; allowing for effective understanding, implementation, and engagement of business processes across organizational boundaries.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1:
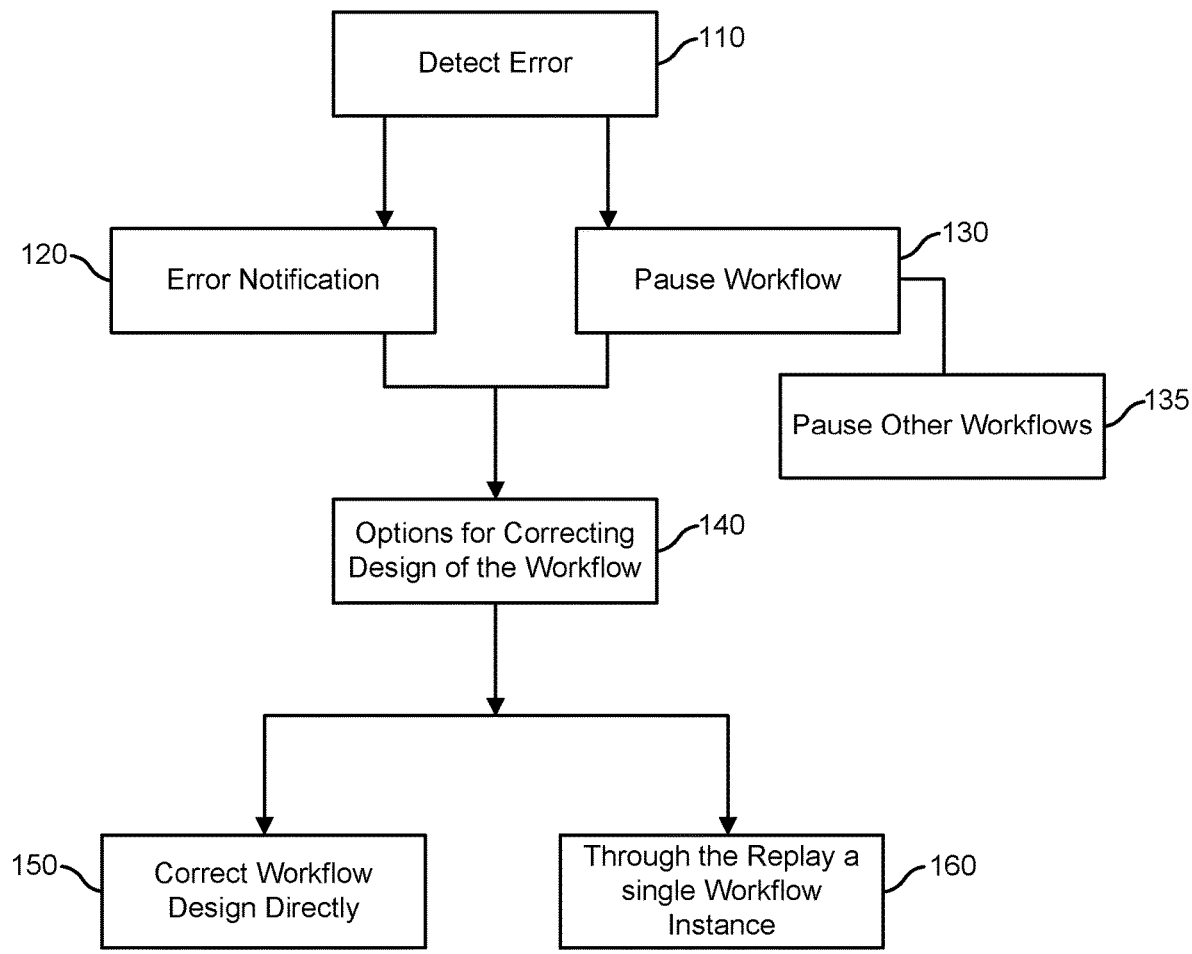
FIG. 1 is a functional flow diagram generally illustrating an embodiment of a design customization system for correcting the design of an erred workflow.

FIG. 1 is a functional flow diagram generally illustrating an embodiment of a design customization system for correcting the design of an erred workflow. As shown in FIG. 1, a design customization system ("design customization") may detect 110 an erred action within a workflow. Embodiments of detecting 110 errors may comprise receiving notification from a third party that an error has occurred, analytical capabilities detecting potential errors, and the design customization detecting an error because it is not able to process a step. Upon detection 110 of the erred action, the design customization, at simultaneous times, both notifies 120 one or more owners or users of the erred workflow that the erred action has occurred and pauses 130 the erred workflow. Additionally, the design customization may also pause other related 135 processes. The design customization then provides options for correcting 140 the design of the workflow, the options 140 comprising: 1) the option to correct directly 150 the workflow design, and 2) the option to first correct 160 the erred workflow from a single workflow instance and then apply the changes to the design of the workflow. Upon correction and republishing of the workflow design, the design customization may also resume all other paused, related workflows and may also update them to reflect the correction.

Figure 2:
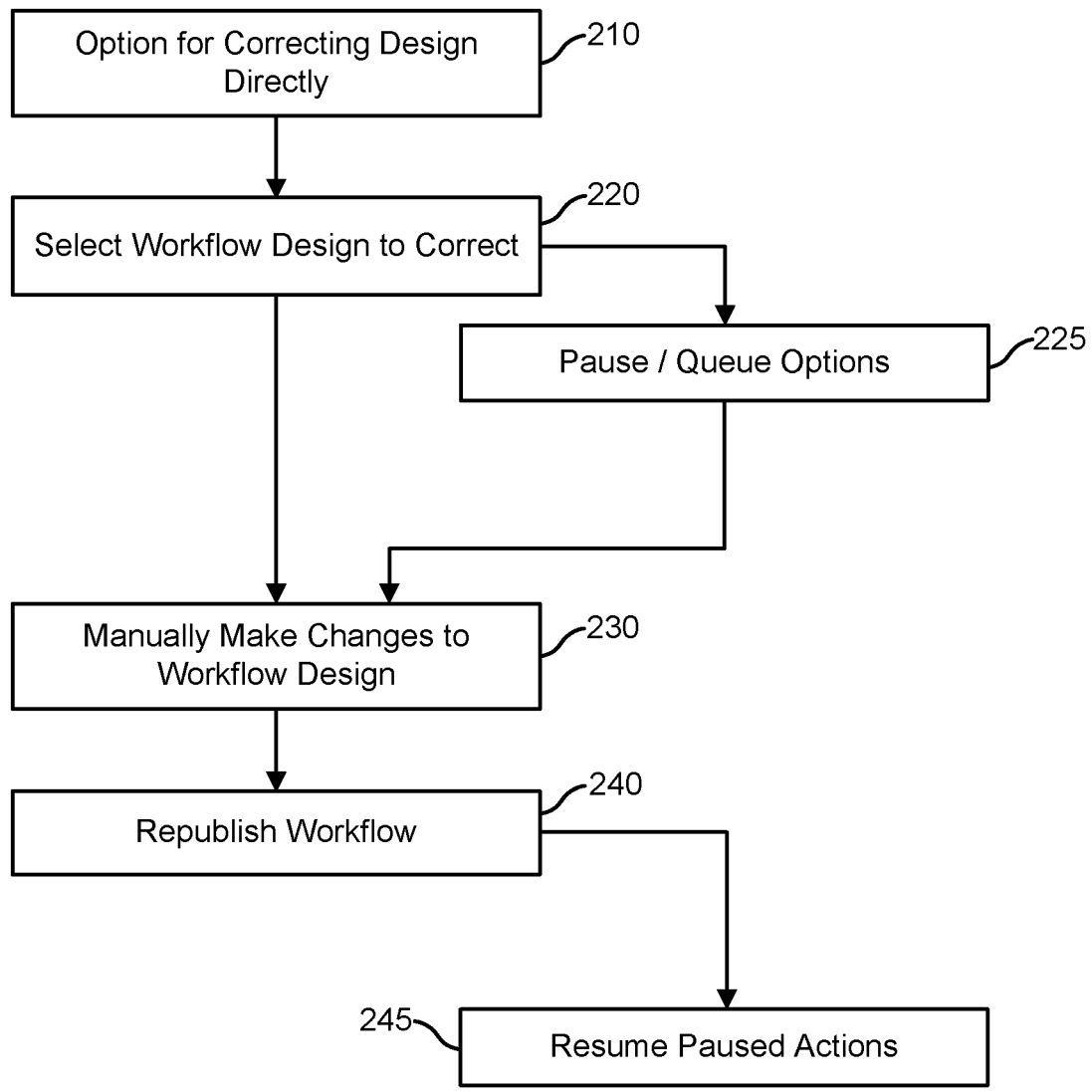
FIG. 2 is a functional flow diagram generally illustrating an embodiment for correcting directly the design of an erred workflow.

FIG. 2 is a functional flow diagram generally illustrating an embodiment for correcting directly the design of an erred workflow. As shown in FIG. 2, upon selection of the option 210 to correct directly the workflow design, the design customization may enable a user to: (1) select 220 a workflow design to correct, (2) manually correct 230 the workflow design, and (3) republish 240 the revised workflow design. In one embodiment, the design customization may identify existing workflow executions and potential workflow executions that are related, dependent, or otherwise relevant to the erred workflow. In doing so, the design customization may then generate and display options to pause 225 existing workflow executions and queue 225 all new workflow executions while the user corrects the workflow design. If the user selected the option to pause 225 existing workflow executions, the user may then resume 245 the paused workflow executions upon the workflow being republished 240. The design customization may also, in addition to generating the option to resume the paused workflow executions, also generate an option to manually resume each individually paused instance. This allows the user to manage each workflow execution and select which ones should be resumed.

Figure 3:
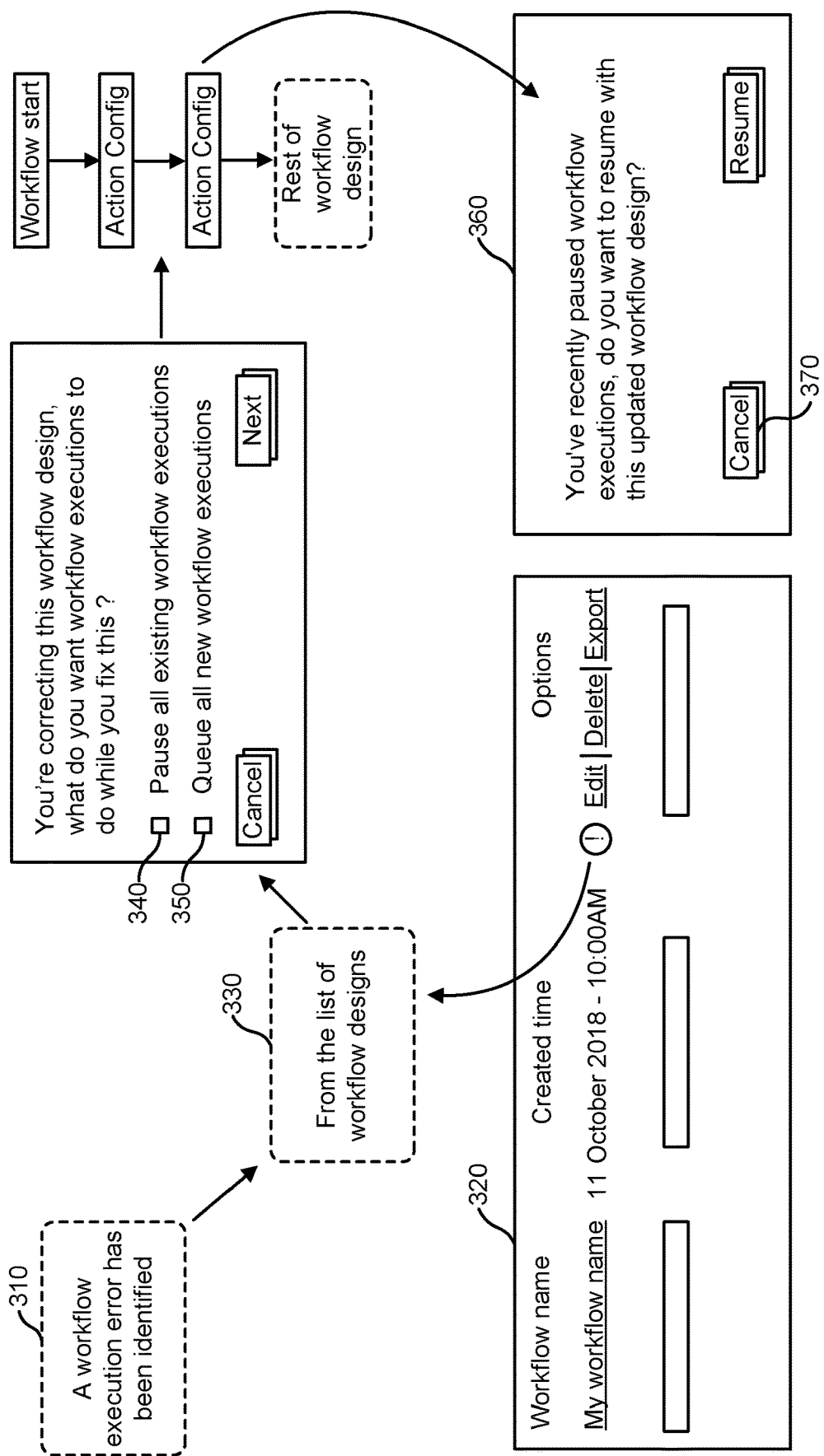
FIG. 3 is a functional block diagram generally illustrating an embodiment for correcting directly the design of an erred workflow.

FIG. 3 is a functional block diagram generally illustrating an embodiment for correcting directly the design of an erred workflow. In one embodiment, design customization may detect 310 an erred workflow execution and notify a user of the error. To correct the design of the erred workflow, the user may go to a list 320 of his workflows, provided by the design customization, and select 330 the erred workflow from the list. Upon the user selecting 330 the erred workflow, the design customization generates update functions for correcting and changing the design of the workflow, wherein the update functions for correcting the workflow design comprise at least one of: input data into the workflow design, remove data from the workflow design, and combinations thereof. The design customization may also identify other existing workflow executions that are connected, related, or in some way relevant to the workflow, and generate and display an option to pause 340 those existing workflow executions. The design customization may also identify all new workflow executions that are connected, related, or in some way relevant to the workflow, and generate and display an option to queue 350 those new workflow executions. The design customization may identify new and existing workflow executions at any point between detection of the erred workflow execution and selection of the workflow design to correct. Once changes or corrections have been made to the design, the design customization may then generate the option to republish the workflow. Upon selection of the option to republish, the design customization may generate and display the option to resume previously paused workflow executions 360 and/or the option to cancel 370 the resume 360 option. The cancel 370 option may provide the user with the options to individually select which specific workflow executions to manually resume.

Figure 4:
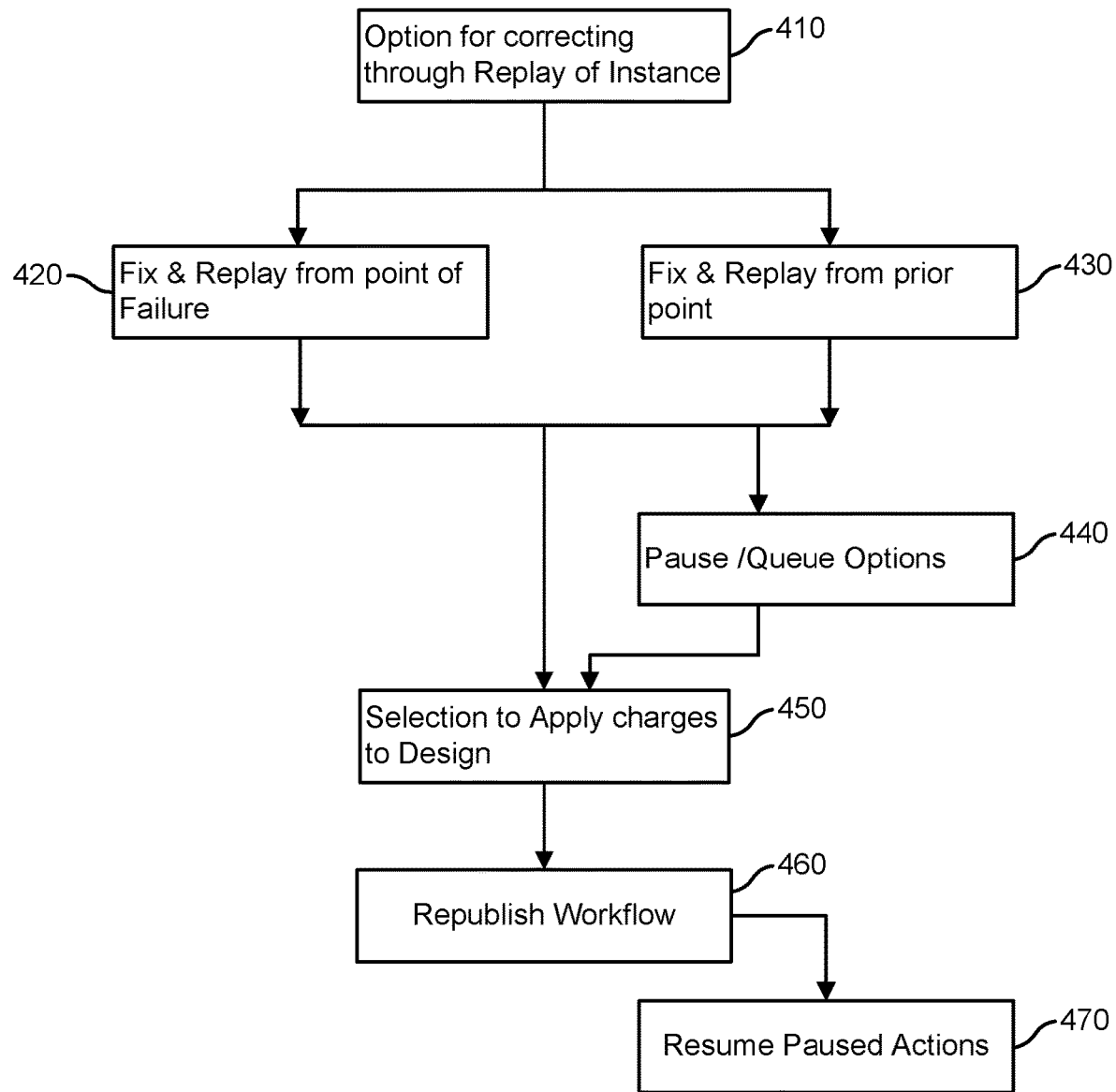
FIG. 4 is a functional flow diagram generally illustrating an embodiment for correcting the design of the erred workflow through replaying a single workflow instance.

FIG. 4 is a functional flow diagram generally illustrating an embodiment for correcting the design of the erred workflow through replaying a single workflow instance. As shown in FIG. 4, upon selection of the option 410 for correcting the workflow design through a single workflow instance, the design customization may generate the update functions for correcting from a single workflow instance, wherein the update functions comprise at least one of: option to fix the erred workflow action directly at the point of failure 420, the option to fix the erred workflow action at a point prior 430 to the point of the erred action, and a combination of both options. Upon correction with one of the update functions for correcting from a single workflow instance, the design customization may generate and display an option to apply 450 the updates/changes/correction from the update functions to the design of the workflow. When selected, the design customization updates the erred workflow with the changes made when either fixing and replaying from the point of failure 420 or when fixing and replaying from a point prior 430 to the point of the erred action. When the workflow is republished 460, the workflow contains the changes made to the erred action.

As shown in FIG. 4, the option to pause, correct, and replay from a single workflow instance comprises the options to fix at either the point of failure 420 or at a point prior to the point of failure 430. Upon the option to replay a single workflow instance being selected, the design customization provides the precise location of the error within the erred workflow and generates and displays either one or both of the options to fixing and replaying from the point of the erred action 420 in the workflow or inserting new data and replaying the erred workflow from a point prior to the erred action 430. When generating either of these two options, the design customization also generates and provides the option to bypass certain actions in the erred workflow that have already been completed. Upon selection of the option to correct and replay from the point of error 420, a user may go directly to the erred action in the workflow, correct the error and/or make necessary changes, and replay the workflow from the action where the error occurred. Upon selection of the option to fix and replay from a prior point 430, a user may select and go to a prior point, where the design customization may receive from the user a different set of data as input.

In one embodiment, the design customization may identify existing workflow executions and potential workflow executions that are related, dependent, or otherwise relevant to the erred workflow. In doing so, the design customization may then generate and display options to pause 440 existing workflow executions and/or queue 440 all new workflow executions while the user corrects the workflow design. If the user selected the option to pause 440 existing workflow executions, the user may then resume 470 the paused workflow executions upon the workflow being republished 460. The workflow customization may also, in addition to generating the option to resume 470 the paused workflow executions, also generate an option to manually resume each paused instance. This allows the user to manage each workflow execution and select which ones should be resumed.

Figure 5:
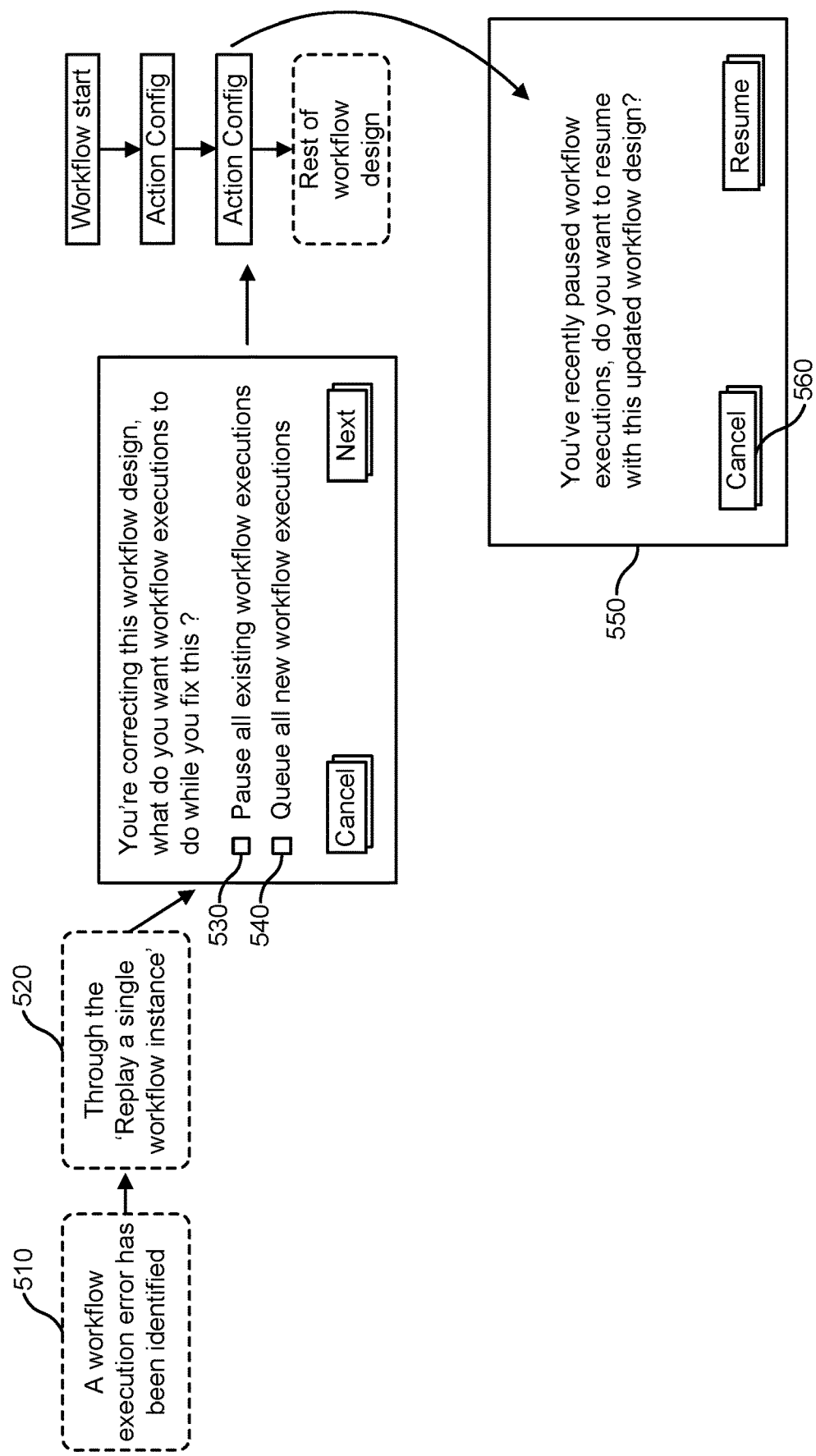
FIG. 5 is a functional block diagram generally illustrating an embodiment for correcting the design of the erred workflow through replaying a single workflow instance.

FIG. 5 is a functional block diagram generally illustrating an embodiment for correcting the design of the erred workflow through replaying a single workflow instance. In one embodiment, design customization may detect 510 an erred workflow execution and notify a user of the error. To correct the design of the erred workflow, the user may go directly to the single workflow instance 520 with the erred action—provided by the design customization—and correct the error either directly at the point of failure or at a point prior to the point of failure. Upon correction via either of these two options, the design customization may generate and display an option to update the design of the erred workflow with the corrective actions and then republish the workflow with the updated data.

At any point between detection 510 of the erred workflow execution and selecting the option to fix and replay from a single workflow instance 520, the design customization may identify other existing workflow executions that are connected, related, or in some way relevant to the workflow, and generate and display an option to pause 530 those existing workflow executions. The design customization may also identify all new workflow executions that are connected, related, or in some way relevant to the workflow, and generate and display an option to queue 540 those new workflow executions. Once changes or corrections have been made to the design, the design customization may then generate the option to republish the workflow. Upon selection of the option to republish, the design customization may generate and display the option to resume previously paused workflow executions 550 and the option to cancel 560 the resume 550 option. The cancel 560 option may provide the user with the options to select which specific workflow executions to manually resume.

The option to pause, fix, and replay from a single workflow instance comprises the options to fix at either the point of failure or at a point prior to the point of failure. Upon the option to replay a single workflow instance being selected, the design customization provides the precise location of the error within the erred workflow and generates and displays either one or both of the options to fixing and replaying from the point of the erred action in the workflow or inserting new data and replaying the erred workflow from a point prior to the erred action. When generating either of these two options, the design customization also generates and provides the option to bypass certain actions in the erred workflow that have already been completed. Upon selection of the option to correct and replay from the point of error, a user may go directly to the erred action in the workflow, correct the error and/or make necessary changes, and replay the workflow from the action where the error occurred.

Figure 6:
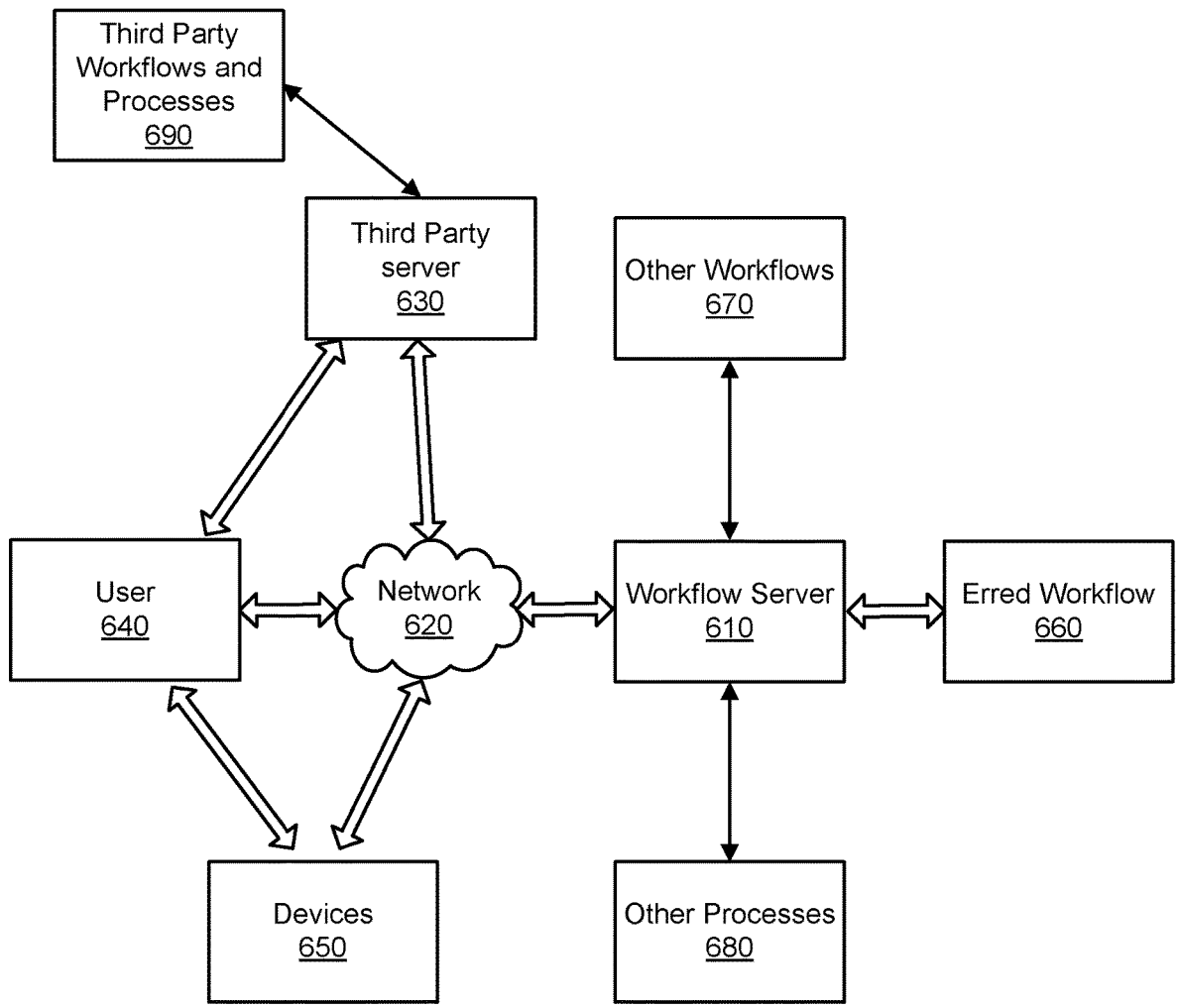
FIG. 6 is a functional block diagram generally illustrating an embodiment of a network system for a workflow design customization system.

FIG. 6 is a functional block diagram generally illustrating an embodiment of a network system for a workflow design customization system. A network system, as shown in FIG. 6, may comprise a workflow server 610 accessible over a local area network or a wide area network 620, such as the Internet. In one embodiment, the workflow design customization system may reside within the workflow server 610. The workflow server 610 may enable third party servers 630, users 640, and electronic devices 650 to connect to an erred workflow 660. The workflow server 610 may also host additional workflows 670 and additional high-level processes 680, each accessible to their respective owners and other users.

In accordance with the preferred embodiment, the workflow server 610 is remotely accessible by a number of user computing devices 650, including for example, laptops, smartphones, computers, tablets, and other computing devices that are able to access the local area network or a wide area network where the workflow server 610 resides. In normal operation, each user electronic device 650 connects with the workflow server 610 to interact with the erred workflow 660 and the additional workflows 670 and processes 680. As is also known, each additional process 670 or workflow 680 may employ a number of connectors to interact with third party 630 servers and their data, services, or applications, such as a third-party workflow or process 690.

Figure 7:
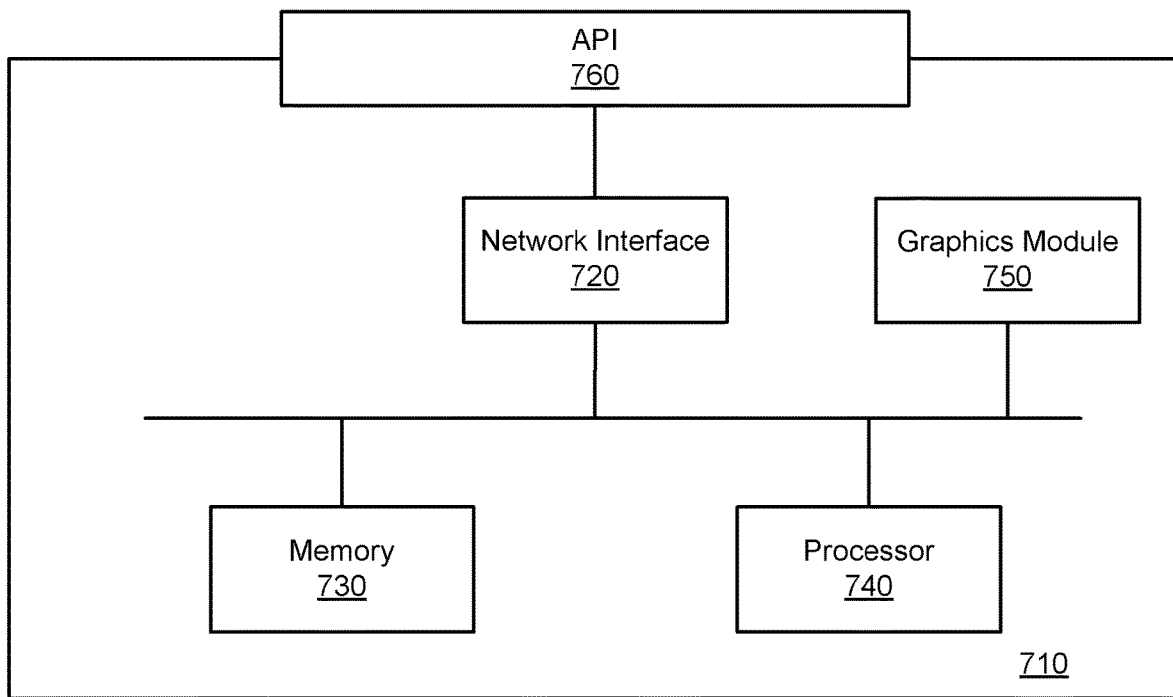
FIG. 7 is a functional block diagram generally illustrating an embodiment of an electronic device system for a workflow design customization system.

FIG. 7 is a functional block diagram generally illustrating an embodiment of an electronic device system for a workflow design customization system. The electronic device 710 may be coupled to a workflow server 610 via a network interface 720. In one embodiment, the electronic device 710 may access the workflow design customization system residing in a workflow server or another server. In another embodiment, the workflow design customization system may reside on the electronic device 710. The electronic device 710 generally comprises a memory 730, a processor 740, a graphics module 750, and an application programming interface 760. The electronic device 710 is not limited to any particular configuration or system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

These and other features, and characteristics of the present technology, as well as the methods of operation and functions of the related elements of structure and the combination of parts and economies of manufacture, will become more apparent upon consideration of the description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A method for correcting designs of programmatic workflow processes comprising:
   detecting an erred action within a programmatic workflow process, wherein a design of the programmatic workflow process comprises one or more executable actions, and wherein the erred action is one of the one or more executable actions;
   displaying, at a graphical user interface (GUI), a notification of the detected erred action;
   generating one or more update functions for updating the design of the programmatic workflow process to correct the erred action,
      wherein the one or more update functions comprise at least one of: inputting data into the design of the programmatic workflow process or removing data from the design of the programmatic workflow process;
   displaying, at the GUI, information of the one or more update functions for updating the design of the programmatic workflow process to correct the erred action;
   and displaying, at the GUI, options to correct the design of the programmatic workflow process by applying an update function of the one or more update functions,
      wherein the options comprise at least one of: (1) an option to correct the design of the programmatic workflow process by directly applying the update function of the one or more update functions, or (2) an option to correct the erred action from a single workflow instance of the programmatic workflow process and then applying the update function of the one or more update functions.

2. The method of claim 1 further comprising:
receiving a selection to implement one or more of the displayed options to correct the design of the programmatic workflow process;
implementing the selected one or more options to generate an updated programmatic workflow process; and
republishing the updated programmatic workflow process.

3. The method of claim 1 further comprising:
identifying a second programmatic workflow process related to the programmatic workflow process; and
displaying, at the GUI, an option to pause the second programmatic workflow process.

4. The method of claim 1 further comprising:
identifying a second programmatic workflow process related to the programmatic workflow process; and
displaying, at the GUI, an option to pause the second programmatic workflow process; and
resuming the second programmatic workflow process after one or more of the options are implemented to generate an updated programmatic workflow process.

5. The method of claim 1 further comprising:
identifying a second programmatic workflow process related to the programmatic workflow process; and
displaying, at the GUI, an option to queue the second programmatic workflow process.

6. The method of claim 1, wherein the corrective options further comprise at least one of: an option to correct from a point of the erred action, or an option to correct from a point prior to the point of the erred action.

7. The method of claim 1 further comprising:
generating and displaying a prompt to republish the programmatic workflow process based at least in part on implementing one or more of the corrective options.

8. The method of claim 1 further comprising:
generating and displaying a revised design of the programmatic workflow process based at least in part on implementing one or more of the corrective options.

9. The method of claim 1, wherein the erred action is detected by: receiving a notification from a third party, one or more analytical functions applied on the programmatic workflow process, or failure of an action during execution of the programmatic workflow process.

10. The method of claim 1 further comprising:
responsive to detecting the erred action:
transmitting a notification about the erred action to one or more users associated with the programmatic workflow process; and
pausing execution of the programmatic workflow process.

11. At least one non-transitory, computer-readable medium carrying instructions, which when executed by at least one data processor, performs operations for correcting designs of programmatic workflow processes, the operations comprising:
displaying, at a graphical user interface (GUI), a notification of a detected erred action within a programmatic workflow,
wherein a design of the programmatic workflow process comprises one or more executable actions, and
wherein the erred action is one of the one or more executable actions;
identifying one or more update functions for updating the design of the programmatic workflow process to correct the erred action,
wherein the one or more update functions comprise at least one of: inputting data into the design of the programmatic workflow process, or removing data from the design of the programmatic workflow process; and
displaying, at the GUI, options to correct the design of the programmatic workflow process by applying an update function of the one or more update functions,
wherein the options comprise at least one of: (1) an option to correct the design of the programmatic workflow process by directly applying the update function of the one or more update functions, or (2) an option to correct the erred action from a single workflow instance of the programmatic workflow process and then applying the update function of the one or more update functions.

12. The at least one non-transitory, computer-readable medium of claim 11, wherein the operations further comprise:
displaying, at the GUI, information of the one or more update functions for updating the design of the programmatic workflow process to correct the erred action.

13. The at least one non-transitory, computer-readable medium of claim 11, wherein the operations further comprise:
detecting the erred action within a programmatic workflow process,
wherein the erred action is detected by: receiving a notification from a third party, one or more analytical functions applied on the programmatic workflow process, or failure of an action during execution of the programmatic workflow process.

14. The at least one non-transitory, computer-readable medium of claim 11, wherein the operations further comprise:
detecting the erred action within a programmatic workflow process;
responsive to detecting the erred action:
transmitting a notification about the erred action to one or more users associated with the programmatic workflow process; and
pausing execution of the programmatic workflow process.

15. The at least one non-transitory, computer-readable medium of claim 11, wherein the operations further comprise:
receiving a selection to implement one or more of the displayed options to correct the design of the programmatic workflow process;
implementing the selected one or more options to generate an updated programmatic workflow process; and
republishing the updated programmatic workflow process.

16. The at least one non-transitory, computer-readable medium of claim 11, wherein the operations further comprise:
identifying a second programmatic workflow process related to the programmatic workflow process; and
displaying, at the GUI, an option to pause the second programmatic workflow process; and
resuming the second programmatic workflow process after one or more of the options are implemented to generate an updated programmatic workflow process.

17. The at least one non-transitory, computer-readable medium of claim 11, wherein the operations further comprise:
identifying a second programmatic workflow process related to the programmatic workflow process; and displaying, at the GUI, an option to queue the second programmatic workflow process.

18. The at least one non-transitory, computer-readable medium of claim 11, wherein the corrective options further comprise at least one of: an option to correct from a point of the erred action, or an option to correct from a point prior to the point of the erred action.

19. The at least one non-transitory, computer-readable medium of claim 11, wherein the operations further comprise:
generating and displaying a prompt to republish the programmatic workflow process based at least in part on implementing one or more of the corrective options.

20. A system for correcting designs of programmatic workflow processes, comprising a non-transitory computer-readable medium having instructions stored thereon, which when executed by one or more processors of the system cause the system to:
display, at a graphical user interface (GUI), a notification of a detected erred action within a programmatic workflow,
wherein a design of the programmatic workflow process comprises one or more executable actions, and
wherein the erred action is one of the one or more executable actions;
identify one or more update functions for updating the design of the programmatic workflow process to correct the erred action,
wherein the one or more update functions comprise at least one of: inputting data into the design of the programmatic workflow process, or removing data from the design of the programmatic workflow process; and
display, at the GUI, options to correct the design of the programmatic workflow process by applying an update function of the one or more update functions,
wherein the options comprise at least one of: (1) an option to correct the design of the programmatic workflow process by directly applying the update function of the one or more update functions, or (2) an option to correct the erred action from a single workflow instance of the programmatic workflow process and then applying the update function of the one or more update functions.

* * * * *